United States Patent [19]
Lee

[11] Patent Number: 4,508,864
[45] Date of Patent: Apr. 2, 1985

[54] PRESSURE SENSITIVE ADHESIVES

[75] Inventor: Ivan S. Lee, Sarnia, Canada

[73] Assignee: Polysar Limited, Sarnia, Canada

[21] Appl. No.: 539,636

[22] Filed: Oct. 7, 1983

Related U.S. Application Data

[63] Continuation of Ser. No. 357,093, Mar. 11, 1982.

[30] Foreign Application Priority Data

Apr. 28, 1981 [CA] Canada ................................. 376453

[51] Int. Cl.³ .......................... C08L 9/08; C08L 93/00
[52] U.S. Cl. .................................... 524/187; 524/272;
428/341
[58] Field of Search ................. 524/187, 272; 428/341

[56] References Cited

U.S. PATENT DOCUMENTS 4,189,419 2/1980 Takemoto et al. .................. 524/273

*Primary Examiner*—John Kight
*Assistant Examiner*—Marvin L. Moore
*Attorney, Agent, or Firm*—Stevens, Davis, Miller & Mosher

[57] ABSTRACT

Improved aqueous based pressure sensitive adhesive compositions are disclosed comprising a latex of a carboxylated butadiene-styrene polymer and a tackifier resin.

9 Claims, No Drawings

PRESSURE SENSITIVE ADHESIVES

This application is a continuation of application Ser. No. 357,093, filed Mar. 11, 1982.

The present invention pertains to pressure sensitive adhesives comprising a synthetic latex and a tackifier resin.

Pressure sensitive adhesives are, among other applications, used in the tape and label field. A pressure sensitive adhesive may be used in a number of applications such as masking tape, electrical tape and medicinal tapes for holding dressings and the like in place. The term label covers a broad range of products and includes items such as price tags in the supermarket and labels on glass or plastic containers. Clearly in the case of "labels" two types of bonding are required namely permanent and removable. Permanent bonding is required for items such as labels on glass or plastic containers when the life of the label will be relatively long. Removable bonding is desirable for items such as price tags and peelable tape.

Pressure sensitive adhesives should have a high initial tack so that the adhesive surface merely need be contacted and pressed to a substrate to achieve bonding. There should be little or no requirement to hold the adhesive and substrate in position for any significant time while a bond develops. Depending upon the strength of adhesion required the bonding force of the adhesive may increase with time to provide a relatively permanent bond.

It is known to prepare at least three different types of adhesives using natural or synthetic tackifiers, natural or synthetic resins, or blends thereof, namely, hot melt adhesives, solution adhesives and aqueous based adhesives. Hot melt adhesives are made from a blend of resins and are normally solid at room temperature. Hot melt adhesives require an elevated temperature for application to a substrate necessitating some type of hot melt gun. Solution adhesives do not suffer from this drawback. These adhesives comprise a solution of a tackifier resin or a blend of tackifier resins in a low boiling hydrocarbon solvent. When the adhesive is applied to a substrate the solvent evaporates. Due to environmental concerns and the rising cost of hydrocarbon solvent there has been an increasing need to reduce or eliminate the hydrocarbon solvent in such adhesives. Accordingly, the adhesives industry is seeking improved aqueous based adhesive compositions. Existing aqueous based adhesive compositions usually comprise a natural or a synthetic latex in admixture with cellulose materials such as starch or natural or synthetic tackifier resins.

The Hercules Powder Company has published a number of brochures relating to the use of its tackifier resins in adhesive compositions. Generally, the tackifier resins are natural rosin which may have been hydrogenated, esters thereof or synthetic hydrocarbon tackifiers. Hercules Publication 17086-A 1750 5-65 15173 entitled "Adhesives", published in about 1967 discloses at pages II-5 and II-9 adhesive compositions which are a blend of a tackifier resin emulsion and an SBR latex. The tackifier emulsion is used in an amount of from about 33% to about 66% of the adhesive composition. The SBR is not of any specific type.

U.S. Pat. No. 4,189,419, issued Aug. 14, 1978, to Avery International discloses a pressure sensitive adhesive comprising from about 50 to 60% by weight on a dry basis of a tackifier and from about 50 to 40% by weight on a dry basis of a carboxylated styrene butadiene polymer.

A paper entitled "Styrene Butadiene Latexes for Adhesives Applications" by Robert G. Kahn of Dow Chemical, published in Adhesives Age, December of 1977 discloses a similar pressure sensitive adhesive composition which also contains butyl benzyl phthalate, as a "plasticizer". While the amount of plasticizer is relatively small the plasticizer comprises a hydrocarbon phase in the adhesive and the composition is not entirely aqueous based.

U.S. Pat. No. 4,179,415 issued Dec. 18, 1979, to Johnson and Johnson discloses a substantially aqueous based adhesive composition containing a latex having a high proportion of isoprene.

The present patent application seeks to provide a novel pressure sensitive adhesive which does not contain a hydrocarbon phase or solvent for the tackifier resin. Additionally, the present invention seeks to provide an aqueous based pressure sensitive adhesive having a lower amount of tackifier resin than those currently known in the art.

The latex of the present invention contains a relatively high content of conjugated diolefin which contributes to the pressure sensitive adhesive properties of the latex per se and the pressure sensitive adhesive properties of the latex in admixture with a tackifier resin or a blend of tackifier resins.

Accordingly, the present invention provides a composition comprising a latex of a polymer and a tackifier resin wherein said polymer is formed by polymerizing:
- (a) from about 20 to about 45 weight % of a vinyl or vinylidene monoaromatic monomer which is unsubstituted or substituted in the aromatic ring by a $C_{1-4}$ alkyl radical or a bromine or chlorine atom;
- (b) from about 50 to about 75 weight % of a $C_{4-6}$ conjugated diene monomer; and
- (c) from about 1 to about 5 weight % of an unsaturated carboxylic acid monomer;

and wherein said polymer has:
- (i) a weight average molecular weight distribution so that from about 20 to about 45 weight % of the polymer has a molecular weight from about 3,500 to about 50,000;
- (ii) a polymeric Tg (D.S.C.) from about $-29.5°$ C. to about $-62°$ C.; and
- (iii) a toluene insoluble portion from about 20 to about 70% by weight;

and wherein said tackifier resin comprises from about 10 to about 35 parts by weight per 100 parts by weight of said polymer and is selected from the group:
- (a) a rosin or a hydrogenated rosin ester which has a ring and ball softening temperature from about 75° to about 100° C.;
- (b) a synthetic hydrocarbon tackifier resin manufactured from a $C_9$ cut of an aromatic hydrocarbon stream or a $C_5$ cut of an aliphatic or cycloaliphatic hydrocarbon stream and having a ring and ball softening temperature of from about 10° to about 85° C.; and
- (c) a synthetic latex of an acrylic resin.

The present invention also provides a method comprising applying the above composition to a substrate in an amount to provide a dry coat weight of from about 16 to about 57 g/m$^2$.

The present invention also provides a substrate coated in an amount from about 16 to about 57 g/m$^2$ with a composition comprising a polymer and a tackifier resin wherein said polymer is formed by polymerizing:
(a) from about 20 to about 45 weight % of a vinyl or vinylidene monoaromatic monomer which is unsubstituted or substituted in the aromatic ring by a $C_{1-4}$ alkyl radical or a bromine or chlorine atom;
(b) from about 50 to about 75 weight % of a $C_{4-6}$ conjugated diene monomer; and
(c) from about 1 to about 5 weight % of an unsaturated carboxylic acid monomer;
and wherein said polymer has:
(i) a weight average molecular weight distribution so that from about 20 to about 45 weight % of the polymer has a molecular weight from about 3500 to about 50,000;
(ii) a polymeric Tg (D.S.C.) from about $-29.5°$ C. to about $-62°$ C.; and
(iii) a toluene insoluble portion from about 20% to about 70% by weight;
and wherein said tackifier resin comprises from about 10 to about 35 parts by weight per 100 parts by weight of said polymer and is selected from the group:
(a) a rosin or a hydrogenated rosin ester which has a ring and ball softening temperature from about 75° to about 100° C.;
(b) a synthetic hydrocarbon tackifier resin manufactured from a $C_9$ cut of an aromatic hydrocarbon stream or a $C_5$ cut of an aliphatic or cycloaliphatic hydrocarbon stream and having a ring and ball softening temperature of from about 10° to about 85° C.; and
(c) a synthetic latex of an acrylic resin.

Preferably, the latex comprises a latex of a polymer formed by polymerizing:
(a) from about 40 to about 45 weight % of said vinyl or vinylidene monoaromatic monomer;
(b) from about 55 to about 69 weight % of said $C_{4-6}$ conjugated diene monomer; and
(c) from about 1 to about 5 weight % of said unsaturated carboxylic acid monomer;
and wherein said polymer has:
(i) a weight average molecular weight distribution so that from about 20 to about 45 weight % of the polymer has a molecular weight from about 3,500 to about 36,000;
(ii) a polymeric Tg (D.S.C.) from about $-29.5°$ C. to about $-35°$ C.; and
(iii) a toluene insoluble portion from about 35% to about 70% by weight.

In the present specification, the term toluene insoluble means the amount of latex solids which can not be dissolved in toluene. This is sometimes referred to in the art as the gel content as determined by toluene extraction.

Conventional high conversion hot emulsion polymerization techniques for the manufacture of carboxylic SBR latex may be used in the manufacture of the latex of the present invention. An aqueous emulsion of monomers is polymerized at a temperature generally from about 70° to about 90° C. over a period of up to about 10 hours. The emulsion is prepared using conventional surfactants. The electrolyte in the emulsion may be any appropriate electrolyte from a processing point of view taking care not to interfere with the end use of the latex. Pyrophosphate electrolytes have been found useful. The catalyst may be any known in the art of emulsion polymerization. Molecular weight control agents or chain transfer agents or modifiers may be any of those conventionally used in the manufacture of carboxylated SBR latexes.

In conducting the polymerization of the polymer it is necessary to ensure that molecular weight distribution of the polymer is such that from about 20 to about 45% of the polymer has a weight average molecular weight from about 3,500 to about 50,000. Preferably from about 20 to about 45% of the polymer has a molecular weight from about 3,500 to 36,000. The molecular weight distribution curve of the latex polymer when plotted as MW/D log (M) against log M may be broad or exhibit two peaks indicating a polymer of polydisperse molecular weight distribution.

The weight average molecular weight distribution and the toluene insoluble portion of the polymer are factors which are believed to contribute to the tack and shear adhesion properties of the composition of the present invention.

In manufacturing the latex of the present invention conventional techniques may be used to control the molecular weight distribution of the polymer in the product. This involves the use of known modifiers or chain transfer agents such as those disclosed in U.S. Pat. Nos. 4,013,824 and 4,064,337 issued Mar. 22, 1977 and Dec. 20, 1977 and assigned to Phillips Petroleum.

Suitable monomers for the vinyl or vinylidene monoaromatic monomer component of the polymer include styrene which is unsubstituted or substituted in the aromatic ring by a $C_{1-4}$ alkyl radical or a chlorine or bromine atom. Typical such monomers include styrene, $\alpha$-methyl styrene, and chlorostyrene. Useful aliphatic $C_{4-6}$ conjugated dienes are well known to those skilled in the art and include monomers such as 1,3 butadiene and isoprene.

Useful unsaturated carboxylic acids may be mono- or di-carboxylic acids. Useful acids contain from about 4 to 6 carbon atoms and include maleic, fumaric, itaconic, butenoic, pentenoic, hexenoic, acrylic and methacrylic acid.

The latex and the tackifier are blended using conventional blenders to provide a homogeneous mixture. Preferably the tackifier is added as an aqueous dispersion. The tackifier may be a natural or a synthetic tackifier resin. The tackifier may be a rosin or a hydrogenated rosin ester which has a ring and ball softening temperature from about 75° C. to about 100° C. Examples of such esters which are suitable for use in the present invention include those sold under the tradenames Stabelite ester 10, Pentalyn H and Floral 85 by Hercules Inc. The tackifier also may be a synthetic hydrocarbon tackifier resin manufactured from a $C_9$ cut of an aromatic hydrocarbon stream which includes predominant amounts of indene and $\alpha$-methyl styrene or from a $C_5$ cut of an aliphatic or cycloaliphatic hydrocarbon stream which includes predominant amounts of piperylene and cyclopentadiene. These fractions from the hydrocarbon streams may be polymerized using conventional cationic and radical polymerization methods. Examples of such resins which are suitable include those sold under the tradenames Piccovar AP-25, Hercotac 4085, Picconal A501 and Piccolyte 110M by Hercules, Inc. These synthetic hydrocarbon tackifier resins should have a ring and ball softening temperature from about 10° to about 85° C. The tackifier may also be a synthetic latex of an acrylic resin such as that sold under the tradename Rhoplex N619 by Rohm and Haas Co. Many such products are available commercially and are usually referred to as acrylic resin latexes suitable for pressure sensitive adhesive applications. Latexes of acrylic resins of low molecular weight ar preferred for use with the present invention.

The tackifier resin may be added to the latex in an amount of from about 10 to about 35 parts by weight per hundred parts of polymer in the latex. Preferably the tackifier resin is added to the latex in an amount from about 20 to about 35 parts by weight per 100 parts of polymer in the latex.

The adhesive compositions of the present invention may be applied to a substrate and then dried using conventional substrates and procedures.

The substrate is usually relatively thin material, usually no greater than about 3.2 mm in thickness. However, the present invention contemplates that the adhesives could be used on conventional types of substrates. In the manufacture of tapes and labels the substrate is a relatively thin sheet material. The sheet material may be a polymeric material which is flexible at about room temperature. The sheet material may be a homopolymer of an ethylenically unsaturated monomer such as ethylene, propylene or vinyl chloride, provided the substrate has sufficient flexibility for the desired end use. Also, the sheet material may be a polyester or a polyamide. The substrate may be made from cellulosic or reconstituted cellulosic material such as rayon. The substrate need not be a sheet material but may be composed of fibers which may be woven, or non woven as is the case in paper. The woven substrate may be made from cellulosic material, such as cotton or from fibers of any of the above mentioned polymers.

The composition is applied to the substrate using conventional coating techniques such as roller coaters, blade coaters, meyer rods or air coaters. The coated substrate is then dried usually be passing it through a heating tunnel or oven which may use circulating hot air or infrared lamps to dry the coated substrate. The drying time will be a function of a number of factors such as the heat capacity of the substrate, the type of heating, the oven temperature, air velocities (if circulating air is used) and the rate of passage of the substrate through the oven or heating tunnel. The manufacturer may readily determine suitable time/temperature relationships to determine optimum drying conditions in his equipment for the product.

The substrate should be coated with sufficient composition to provide a dry coat weight from about 16 to about 57 g/m$^2$. Generally in the manufacture of tapes using a continuous sheet polymeric substrate a dry coat weight of about 27-29 g/m$^2$ is used. In the manufacture of labels a dry coating weight from about 19 to about 29 g/m$^2$ is usually used. In the manufacture of masking tape a dry coating weight from about 40 to about 57 g/m$^2$ is usually used.

After drying the coated substrate is cut to the required dimension. In the manufacture of tape the substrate is cut into strips and rolled to provide a finished product. The substrate may also be cut into shaped items to provide labels or medicinal tapes. These processes are known to those in the tape industry.

Without wishing to limit the scope of the disclosure the following example illustrates some aspects of the present invention.

EXAMPLE 1

Table 1 lists some of the physical properties of typical latices used in formulating the compositions of the present invention. All of the latices are high conversion hot polymerized carboxylated styrene-butadiene latices prepared by methods well known to the art.

TABLE I

| Typical Physical Properties | Latex A | Latex B | Latex C | Latex D |
|---|---|---|---|---|
| Total solids, % by wt. | 51.5 | 51.5 | 53.5 | 51.8 |
| pH | 8.8 | 8.8 | 9.0 | 9.0 |
| Bound styrene by IR, % | 41.0 | 41.0 | 29.1 | 25.5 |
| Tg (by DSC), °C. | −35.0 | −34.0 | −50.0 | −58.0 |
| Gel content (by toluene extraction), % by wt. | 36–42 | 55–60 | 55.1 | 47.5 |
| Polymers having wt. average molecular wt. below 36,000, % by wt. | 32–40 | 20–26 | 22.6 | 30.8 |

Tables II and III list pressure sensitive adhesive properties of typical compositions prepared according to the present invention. The compounds were formulated by blending all components in aqueous dispersion or emulsion form by simple stirring. Also included in Table III are two composition containing no tackifier resin for comparison.

The pressure sensitive adhesive properties of the compositions are determined utilizing standard Pressure-Sensitive Tape Council (PSTC) tests. Polyken Probe-Tack test is conducted according to ASTM-D2979 on a Polyken Probe Tack Tester supplied by Testing Machine Inc. under the following conditions:

Probe: 304 S.S. 0.5 cm diameter probe polished to a f/0 emery paper finish
Dwell Time: 1 second
Contact Pressure: 100 gm/cm$^2$
Separation Speed: 1 cm/sec
Temperature: 25° C.
Relative Humidity: 50%

The tape samples required for these tests were prepared by drawing a 2.5×10$^{-5}$ m thick Mylar* (trademark) sheet through the adhesive composition and beneath a bar coater. The bar was spaced above a drawing guide surface by two feeler guages and sufficient composition was applied to provide a dry coat weight of 38–40 g/m$^2$. The resulting coated film was dried in an air circulating oven at 110±5° C. for 2.5 minutes.

TABLE II

| Components | Parts by Dry Weight | | | | | | | | | | | |
|---|---|---|---|---|---|---|---|---|---|---|---|---|
| Latex A | 100 | 100 | 100 | 100 | 100 | 100 | — | — | — | — | — | — |
| Latex B | — | — | — | — | — | — | 100 | 100 | 100 | 100 | 100 | 100 |
| Staybelite ester 10 | 30 | — | — | — | — | — | 30 | — | — | — | — | — |
| Pentalyn H | — | 30 | — | — | — | — | — | 30 | — | — | — | — |
| Piccover AP-25 | — | — | 30 | — | — | — | — | — | 30 | — | — | — |
| Hercotec 4085 | — | — | — | 30 | — | — | — | — | — | 30 | — | — |
| Picconal A501 | — | — | — | — | 30 | — | — | — | — | — | 30 | — |
| Rhoplex N619 | — | — | — | — | — | 30 | — | — | — | — | — | 30 |

TABLE II-continued

Parts by Dry Weight

| Pressure Sensitive Adhesive Properties 180° Peel (PSTC-1) | | | | | | | | | | | | |
|---|---|---|---|---|---|---|---|---|---|---|---|---|
| Dwell time = 1 min., g/cm | 1060 | 924 | 931 | 686 | 609 | 578 | 286 | 202 | 270 | 283 | 231 | 356 |
| Dwell time = 15 min., g/cm | 1201 | 995 | 1054 | 811 | 635 | 637 | 333 | 309 | 307 | 350 | 266 | 402 |
| 2" Static Shear (PSTC-7) | | | | | | | | | | | | |
| 1" × 1"/1,000 g/25° C./HRS | >48 | >48 | >48 | >48 | >48 | >48 | >48 | >48 | >48 | >48 | >48 | >48 |
| 1" × 1"/500 g/100° C./HRS | >8 | >8 | 4.4 | >8 | 1.7 | 0.8 | >48 | >48 | >48 | >48 | >48 | 0.6 |
| 90° Quick Stick (PSTC-5) g/cm | 506 | 568 | 542 | 320 | 419 | 399 | 206 | 189 | 230 | 232 | 185 | 292 |
| Rolling Ball Tack (PSTC-6), cm | 4–6 | 5–7 | 2–4 | 8–10 | 1–3 | 2–4 | >21 | >21 | 15–18 | >21 | 16–18 | 4–5 |
| Polyken Probe Tack (ASTM-D2979) g/cm$^2$ | 996 | 954 | 892 | 912 | 892 | 924 | 543 | 405 | 457 | 382 | 434 | 503 |
| Character of Adhesive Failure | | | | | | | | | | | | |
| A = clean adhesive failure<br>C = cohesive failure | A/C | A/C | A/C | A | A | A | A | A | A | A | A | A |

TABLE III

| Component | Parts by dry weight | | | | | |
|---|---|---|---|---|---|---|
| Latex C | 100 | 100 | 100 | — | — | — |
| Latex D | — | — | — | 100 | 100 | 100 |
| Piccover AP-25 | — | 25 | — | — | 25 | — |
| Staybelite ester 10 | — | — | 25 | — | — | 25 |
| Pressure Sensitive Adhesive Properties 180° Peel (PSTC-1), g/cm | | | | | | |
| dwell time = 1 min. | 346 | 287 | 443 | 415 | 443 | 590 |
| dwell time = 15 min. | 383 | 287 | 454 | 429 | 448 | 601 |
| 2" Static Shear (PSTC-7), hr. for | | | | | | |
| 1" × 1"/1 kg/25° C. | >24 | >24 | >24 | >24 | >24 | >24 |
| 1" × 1"/1 kg/66° C. | 5 | 5 | 5 | 5 | 4.5 | 5 |
| 90° Quick Stick (PSTC-5), g/cm | 138 | 258 | 330 | 262 | 412 | 409 |
| Rolling Ball Tack (PSTC-6), cm | 4.0 | 0.5 | 1.5 | 3.5 | 0.5 | 1.0 |
| Polyken Probe Tack (ASTM-D2979), g/cm | 536 | 633 | 881 | 897 | 860 | 1,000 |
| Character of Adhesive Failure | | | | | | |
| A = adhesive failure<br>C = cohesive failure | A | A | A | A | A/C | A/C |

What is claimed is:

1. A composition comprising a latex of a polymer and a tackifier resin wherein said polymer is formed by polymerizing:
    (a) from about 20 to about 45 weight percent of a vinyl or vinylidene monoaromatic monomer which is unsubstituted or substituted in the aromatic ring by a $C_{1-4}$ alkyl radical or a bromine or chlorine atom;
    (b) from about 50 to about 75 weight percent of a $C_{4-6}$ conjugated diene monomer; and
    (c) from about 1 to about 5 weight percent of an unsaturated carboxylic acid monomer; and wherein said polymer has:
        (i) a weight average molecular weight distribution so that from about 20 to about 45 weight percent of the polymer has a molecular weight from about 3,500 to about 36,000;
        (ii) a polymeric Tg (DSC) from about −29.5° to about −62° C.; and
        (iii) a toluene insoluble portion from about 20 percent to about 70 percent by weight; and wherein said tackifier resin comprises from about 10 to about 35 parts by weight per 100 parts by weight of said polymer and is selected from the group:
    (a) a rosin or a hydrogenated rosin ester which has a ring and ball softening temperature from about 75° to about 100° C.

2. The composition according to claim 1 wherein said polymer is formed by polymerizing (a) from about 40 to about 45 weight % of said monoaromatic monomer, (b) from about 55 to about 69 weight % of said diene monomer, and (c) from about 1 to about 5 weight % of said acid monomer, and wherein said polymer has (i) a weight average molecular weight distribution so that from about 20 to about 45 weight % of said polymer has a molecular weight from about 3,500 to about 36,000, (ii) a polymeric Tg (DSC) from about −29.5° to about −35° C., and (iii) a toluene insoluble portion from about 35% to about 70% by weight.

3. The composition according to claim 2 wherein said monoaromatic monomer is styrene, said diene monomer is butadiene, and said acid monomer is itaconic acid.

4. The composition according to claim 3 wherein said tackifier resin is present in an amount from about 20 to about 35 parts by weight per 100 parts by weight.

5. The composition according to claim 3 wherein said tackifier resin is present in an amount from about 20 to about 35 parts by weight per 100 parts by weight of said polymer and is a synthetic hydrocarbon tackifier resin manufactured from a $C_9$ cut of an aromatic hydrocarbon stream or from a $C_5$ cut of an aliphatic or cycloaliphatic hydrocarbon stream, which resin has a ring and ball softening temperature from about 10° to about 85° C.

6. A substrate coated in an amount from about 16 to about 57 g/m$^2$ with a composition comprising a polymer and a tackifier resin wherein said polymer is formed by polymerizing:
    (a) from about 20 to about 45 weight percent of a vinyl or vinylidene monoaromatic monomer which is unsubstituted or substituted in the aromatic ring by a $C_{1-4}$ alkyl radical or a bromine or chlorine atom;
    (b) from about 50 to about 75 weight percent of a $C_{4-6}$ conjugated diene monomer; and
    (c) from about 1 to about 5 weight percent of an unsaturated carboxylic acid monomer; and wherein said polymer has:
        (i) a weight average molecular weight distribution so that from about 20 to about 45 weight percent of the polymer has a molecular weight from about 3,500 to about 36,000;
(ii) a polymeric Tg (DSC) from about −29.5° to about −62° C.; and
(iii) a toluene insoluble portion from about 20 percent to about 70 percent by weight; and wherein said tackifier resin comprises from about 10 to about 35 parts by weight per 100 parts by weight of said polymer and is selected from the group:
(a) a rosin or a hydrogenated rosin ester which has a ring and ball softening temperature from about 75° to about 100° C.

7. The substrate according to claim 6 wherein said polymer is formed by polymerizing (a) from about 40 to about 45 weight % of said monoaromatic monomer, (b) from about 55 to about 69 weight % of said diene monomer, and (c) from about 1 to about 5 weight % of said acid monomer, and wherein said polymer has (i) a weight average molecular weight distribution so that from about 20 to about 45 weight % of said polymer has a molecular weight from about 3,500 to about 36,000, (ii) a polymeric Tg (DSC) from about −29.5° to about −35° C., and (iii) a toluene insoluble portion from about 35% to about 70% by weight.

8. The substrate according to claim 7 wherein said monoaromatic monomer is styrene, said diene monomer is butadiene, and said acid monomer is itaconic acid.

9. The substrate according to claim 8 wherein said tackifier resin is present in an amount from about 20 to about 35 parts by weight per 100 parts by weight of said polymer.

* * * * *